April 3, 1962 D. S. YORK ET AL 3,027,747
SIMULATION TABLE

Filed Jan. 23, 1956 3 Sheets-Sheet 1

INVENTORS.
DAVID S. YORK
BERTRAM W. McFADDEN
BY WILLIAM B. MEARA Jr.
ATTORNEY.

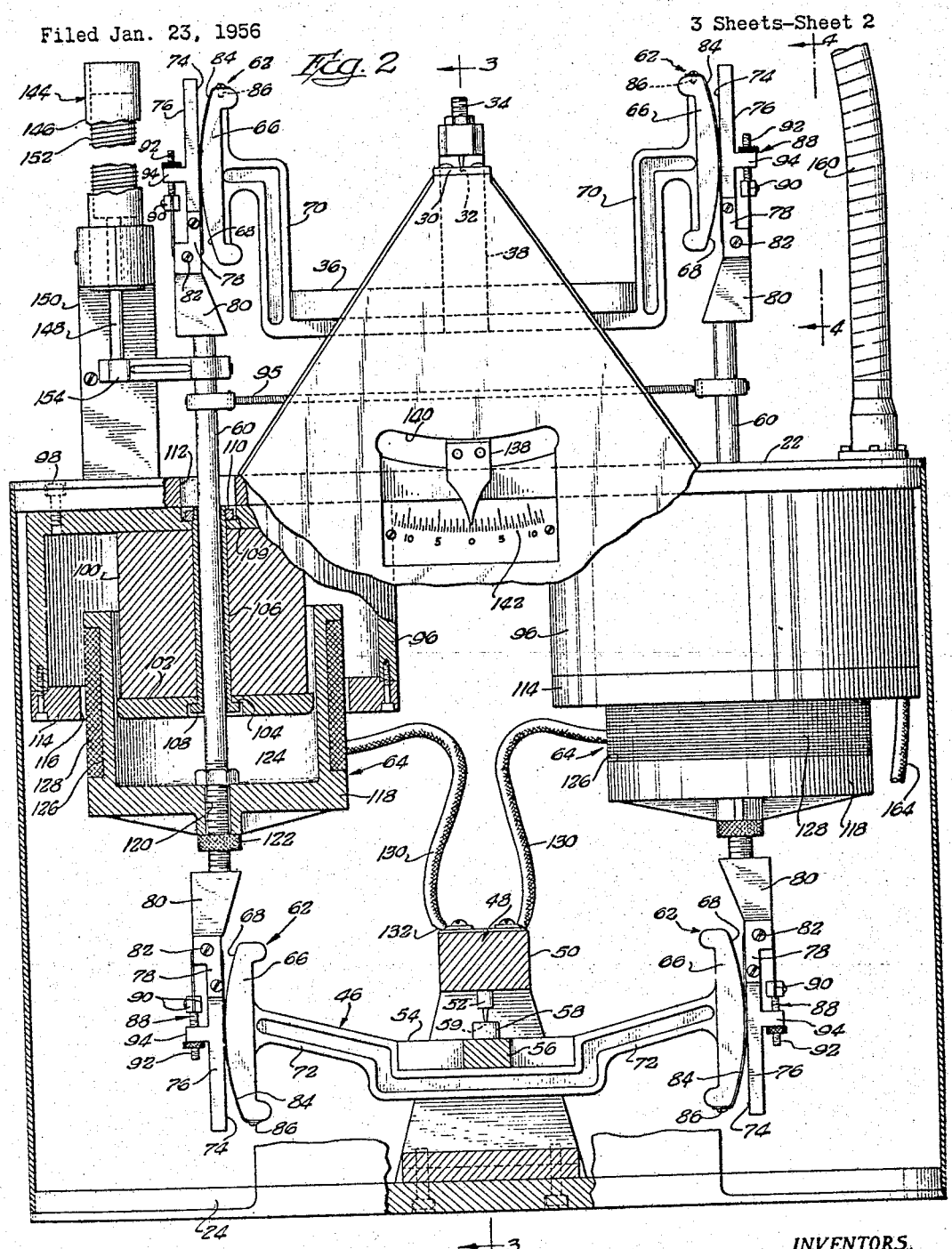

April 3, 1962

D. S. YORK ET AL 3,027,747

SIMULATION TABLE

Filed Jan. 23, 1956

INVENTORS.
DAVID S. YORK
BERTRAM W. McFADDEN
BY WILLIAM B. MEARA JR.

ATTORNEY.

_United States Patent Office_ 3,027,747
Patented Apr. 3, 1962

3,027,747
SIMULATION TABLE
David S. York, 1045 Ave. H, Redondo Beach, Calif.;
Bertram W. McFadden, 11479 Segrell Way, Culver
City, Calif.; and William B. Meara, Jr., 14423 Denver
Ave., Gardena, Calif.
Filed Jan. 23, 1956, Ser. No. 560,766
4 Claims. (Cl. 73—1)

This invention relates generally to simulation equipment for use in testing flight control apparatus and particularly to an oscillatory or roll table for angularly tilting automatic flight control sensors and instruments, such as gyros and accelerometers, in response to predetermined input signals for test and flight simulation purposes.

Recent advances in the field of aircraft and missile propulsion have made possible extremely high flight speeds with an attendant requirement of increased sensitivity and improved response in aircraft instrumentation and control equipment and especially in automatic flight control systems. Thus, for a given sensitivity or lag in response of an automatic flight control system, the maximum deviation of an aircraft or missile from a desired course increases in proportion to increase in air speed so that to maintain such maximum deviation within predetermined limits, the sensitivity of the control system must be increased and its lag in response decreased in proportion to the increase in flight speed.

The development of improved, automatic flight control apparatus, of course, necessitates test and simulation equipment for such apparatus having correspondingly increased sensitivity and response characteristics. While numerous types of test and simulation apparatus are in existence, they are not completely satisfactory owing either to their extreme complexity, large size, and cost, or to their inability to accurately test automatic flight control sensors and instruments within the range of operating conditions under which they must function in high speed aircraft and missiles. Thus, the extreme sensitivity and response requirements of automatic flight control systems for use in high speed aircraft and missiles, necessitate the generation by the sensor or instrument of an accurate correcting signal in response to an extremely small force, in the case of acceleration or deceleration sensitive instruments, and to slight angular deviations in the case of other control instruments. Thus, acceleration and deceleration responsive instruments must be capable of detecting acceleration and deceleration forces in the Micro "G" range ("G"=32.16 feet second/second) while gyros and other similar control instruments must be accurately responsive to extremely minute, relative, angular displacements of the gyro elements.

Existing equipment of the present type is incapable of accurately testing flight control instruments and systems within the above range of operation conditions owing mainly to the excessive friction and noise involved in the operation of the equipment, which prevents accurate, controlled operation within this range. Moreover, often the background noise introduced by the equipment is greater in magnitude or intensity than the signal generated by the instrument under test and thus obscures the signal. The threshold of operation of existing equipment is generally greater than that of the instruments under test so that it is impossible to determine the threshold characteristics of the instruments. Finally, the excessive size and cost of existing equipment of this type preclude its acquisition by all except major test installations where it is desirable and frequently absolutely essential that relatively small facilities involved in the manufacture and development of flight control systems and instruments be provided with such test and simulation equipment.

A primary object of the present invention is the provision of test and flight simulation apparatus of the character described which avoids the above-noted and other deficiencies of existing equipment of this nature.

Another object of the invention is the provision of an improved roll table of the class described which is capable of accurately testing and determining the operating characteristics of automatic flight control sensors and instruments and simulating flight conditions within the range of operation necessary to the accurate control of high speed aircraft and missiles.

Still another object of the invention is the provision of a roll table for angularly tilting automatic flight control sensors and instruments in response to predetermined electrical input signals corresponding to given test or simulated flight conditions.

A further object of the invention is the provision of a roll table of the class described having an extremely low threshold, a relatively high natural frequency, and an extremely low order of operation friction and noise so as to be capable of accurate test and flight simulation operation in conjunction with automatic flight control sensors and instruments intended for accurate automatic flight control in the microgee and microradian range.

Still a further object of the invention is the provision of a roll table of the class described for angularly displacing automatic flight control instruments for simulating flight conditions in the ground testing of complete aircraft or missile stabilization systems or as an oscillating table for determining the frequency response and threshold characteristics of high performance gyros and accelerometers.

Yet a further object is the provision of a roll table of the class described wherein an instrument under test may be located on the table with its sensitive axis in coincidence with the roll axis of the table so as to be subjected to pure angular displacement.

A still further object of the invention is the provision of a roll table of the class described which is relatively small and compact in size, relatively inexpensive to manufacture, and which may be employed in conjunction with various types of signal sources, such as A.C. or D.C. serial generators, analogue computers, and magnetic tape inputs.

The invention may be best understood by reference to the following detailed description thereof taken in conjunction with the accompanying drawings, wherein:

FIGURE 2 is a front plan view of the roll table of FIGURE 1 with parts broken away for the sake of clarity;

Figure 1:
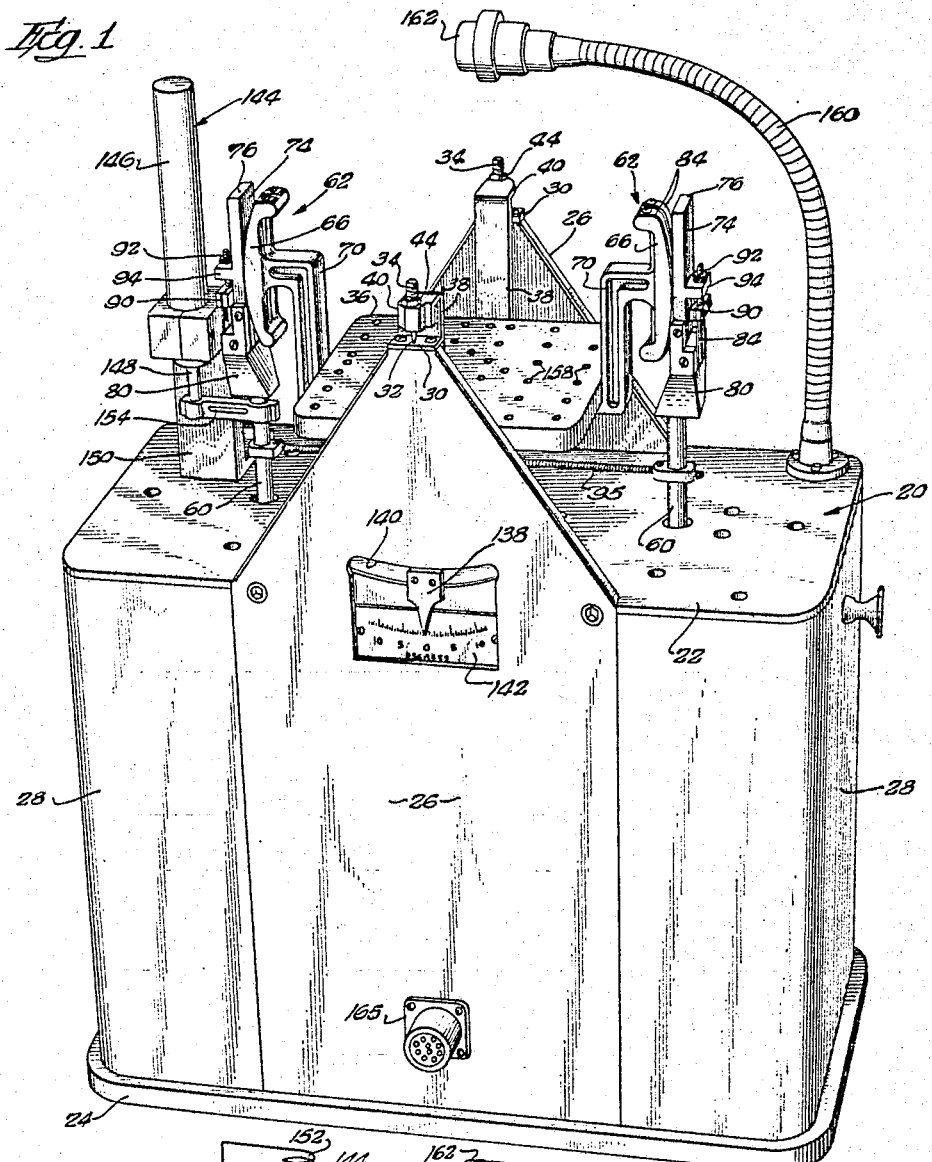
FIGURE 1 is a perspective view of the present roll table.

Referring now to these drawings, the present roll table comprises a hollow base 20 to be supported on a horizontal surface and including horizontal top and bottom panels 22 and 24, respectively, to which are rigidly attached front and rear side panels 26 having a width somewhat less than the length of the sides of the base 20, as shown. Opposite ends of the base and the openings at the opposite sides of the panels 26 are closed by end panels 28 of general U-shaped configuration which are removably secured on the base in any suitable manner so as to permit access to the interior of the latter.

The panels 26 include tapered upper end portions which project a distance above the top panel 22 of the base and terminate in horizontal, coplanar end faces to which are secured a pair of bearing plates 30. These bearing plates have slight recesses or depressions 32 in their upper faces in which are seated the pointed ends of a pair of threaded, pointed bearing pins 34 for supporting an angular displacement platform 36 on the base 20 for rocking movement about a horizontal axis passing through the points of contact of the bearing pins 34 with the bottoms of the depressions 32.

Figure 3:
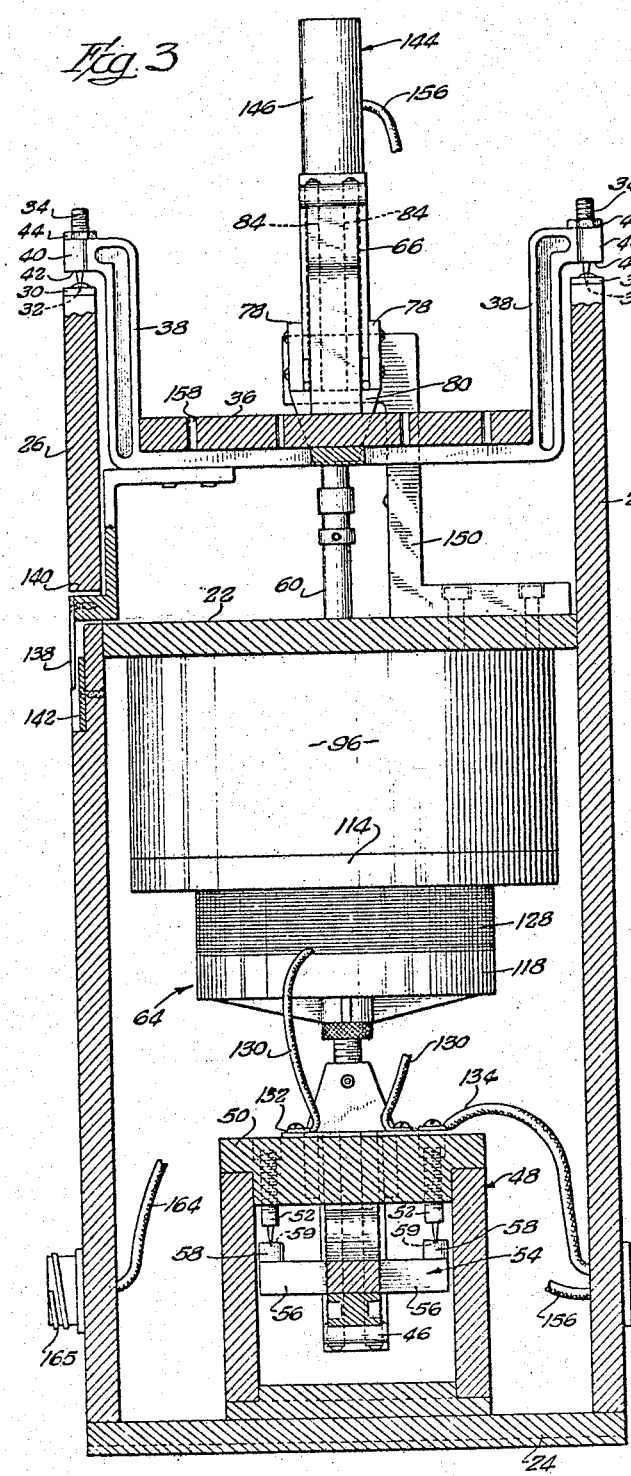
FIGURE 3 is a section taken substantially along the line 3—3 of FIGURE 2.
Figure 4:
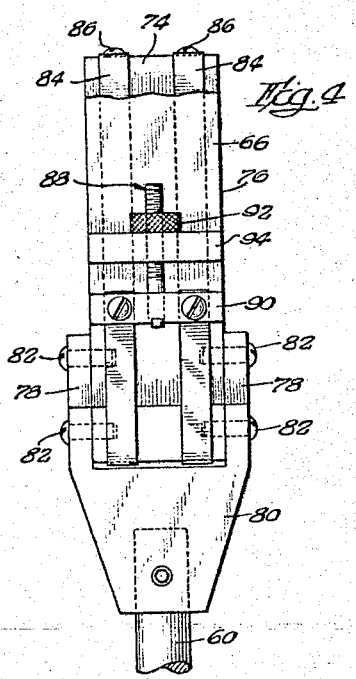
FIGURE 4 is an enlarged view looking in the direction of the arrows 4—4 in FIGURE 2, parts being broken away for clarity.

Platform 36, on which an instrument or sensor to be tested is mounted, as will presently be seen, is of generally rectangular shape and has rigidly joined to the midpoints of its opposite sides a pair of upstanding arms 38 the spacing between the outer surfaces of which is somewhat less than the spacing between the inner surfaces of the panels 26, as may be seen most clearly from FIGURE 3, so that the angular displacement platform is capable of free rocking movement between the side panels. The upper extremities of the arms 38 have outwardly directed extensions 40 which are bored and tapped for receiving the threaded bearing pins 34 with the axes of the latter extending normally to the platform 36. The threaded engagement of the bearing pins in the extensions 40 permits axial adjustment of the pins so that their pointed tips, which rockably bear on the bottoms of the depressions 32, may be placed a desired distance below the lower faces 42 of the extensions during initial alinement of the table, as will be presently described. A pair of lock nuts 44 are threaded on the bearing pins for retaining the latter in a given adjusted position.

The present roll table embodies a lower rocker 46 (FIGURES 2 and 3) which extends in general parallelism with the angular displacement platform 36 through an open rectangular rocker support 48 secured to the bottom panel 24 of the base 20 and including a horizontal bridge piece 50 overlying the center of the rocker 46. Bridge piece 50 has a second pair of bearing pins 52 threaded therein with their axes in a vertical plane passing through the depressions 32 in the upper bearing plates 30 and their pointed tips projecting a distance below the under face of the bridge piece 50.

Rocker 46 comprises a channel section member shaped, as shown in FIGURE 2, to provide a depressed intermediate portion having a planar upper surface to which is attached, by suitable fastening means, not shown, a bearing plate 54 of cruciform configuration and including a pair of extensions 56 projecting laterally of the rocker 46 at its center. Bearing plate extensions 56 fixedly mount, adjacent their ends, bearing inserts 58 of suitable hardened material having coplanar upper faces formed with depressions 59 for receiving the pointed tips of the bearing pins 52 so that the rocker 46 is rockably mounted on the support 48 for pivotal movement about a horizontal axis parallel to the rocking axis of the angular displacement platform 36.

A pair of elongated, rectilinearly movable, actuating elements 60 are operatively connected, by means generally indicated at 62, to the angular displacement platform and the rocker at opposite sides of the pivotal axes thereof, the connecting means 62 serving to convert the rectilinear movement of the actuating members 60 to rocking movement of the platform and rocker, as will presently be more fully described. Rectilinear movement is imparted to the actuating members 60 by energization of a pair of electromagnetic means, generally indicated at 64, for causing either desired angular displacement of the platform 36 from its normal horizontal, or neutral, position or rocking of the platform at a desired frequency, as will subsequently be more fully described.

The several means 62 for converting rectilinear movement of the actuating members 60 to rocking movement of the platform and rocker are identical and each comprises an arcuate rocker head 66 having a cylindrical surface 68. The arcuate heads 66 on the platform 36 are formed at the upper ends of a pair of generally L-shaped upstanding arms 70 rigidly joined at their lower ends to the midpoints of opposite ends of the angular displacement platform 36. The arcuate heads 66 on the rocker 46 are formed at the ends of a pair of upwardly inclined arms 72 comprising the rocker.

The cylindrical surfaces 68 on the arcuate heads 66 associated with the platform 36 are generated about a common axis parallel to the platform and lying in the plane of the axes of the bearing pins 34. This common axis of cylindrical surfaces 68 on the platform is displaced a distance below the aforementioned under faces 42 of the extensions 40 mounting the bearing pins 34, and in the adjusted condition of parts, the bearing pins 34 are so axially positioned that their pointed tips lie on said common axis so that the platform 36 will rock about the latter. The cylindrical surfaces 68, associated with the rocker 46, are generated about a common axis passing through the bottoms of the depressions 59 in the hardened bearing inserts 58 on the rocker so that rocking movement of the latter will take place about this common axis.

The means 62 further comprise planar surfaces 74 at opposite ends of the actuating members 60 bearing against respective ones of the cylindrical surfaces 68 on the platform and rocker. These planar surfaces 74 are formed on hardened bearing plates 76 which are rigidly fixed at one end between pairs of spaced arms 78 formed on supporting brackets 80 secured to opposite ends of the actuating members 60. The bearing plates 76 are separately made and secured between the arms 78, as by means of screws 82, for ease of manufacture. The planar surfaces 74 on each of the actuating members 60 are coplanarly disposed on the axis of the respective actuating members 60.

A pair of straps 84 of flexible material are secured at one end, as by means of screws 86, to the upper and lower ends of each of the cylindrical heads 66 on the platform 36 and rocker 46, respectively, and pass over the cylindrical surfaces of the respective heads, between said surfaces and the planar surfaces 74 of the associated bearing plates 76, around the ends of the latter which are disposed between the bracket arms 78, to fastening means 88 which secure the other ends of the straps 84 to the bearing plates 76. Fastening means 88 comprise clamp plates 90 between which said other ends of the straps 84 are gripped and which are adjustably secured, as by adjusting screws and nuts 92, to extensions 94 on the outer sides of the bearing plates 76. The arrangement is such that the relative angular positions of the platform and rocker and the bearing pressure between the bearing pins 34 and 52 and their respective bearing plates may be adjusted by adjustment of the screws and nuts 92 to vary the tension in the straps 84. Members 60 are resiliently urged toward the arcuate members 66 by a spring 95 secured at opposite ends to the members 60.

From the above description of the connecting means 62, it will be seen that rocking of the platform and rocker will impart true rectilinear movement to the actuating members 60 by virtue of the rolling of the cylindrical heads 66 over the bearing plates 76. Conversely, when rectilinear movement is imparted to the actuating members 60, in opposite directions, by the electromagnetic means 64, as hereinafter described, the straps 84 will cause the cylindrical heads 66 to roll over the bearing plates 76 to convert the rectilinear movement of the actuating members to rocking movement of the platform and rocker about their horizontal axes passing through the tips of the bearing pins 34 and 52. It may further be seen that angular movement of the platform 36, will be directly proportional to the rectilinear movement of the actuating members 60 rather than being a sine or cosine function of such rectilinear movement as would be the case if linkage means or flexible connectors were utilized for converting the rectilinear movement to angular movement. Also, the present connecting means 62 provide for substantially no friction or extraneous background noise during the operation of the actuating members to oscillate the platform 36. The disposition of the planar surfaces 74 on the bearing plates 76 in coplanar relationship with the axes of the actuating members 60 precludes the creation of any stresses which would tend to bend the actuating members 60 and thus introduce inaccuracies into the operation of the system.

The pair of electromagnetic means 64 for imparting rectilinear movement to the actuating members 60 to oscillate or angularly displace the table 36 about its rocking axis are identical and, accordingly, only the left hand one of the means 64, which is sectioned, will be described, the description, however, applying as well to the right hand means 64. Means 64 comprises a downwardly opening cup-shaped element 96 of magnetically permeable material attached, by means of screws 98, to the underside of the top panel 22 of the base 20 in coaxial relationship to the respective one of the actuating members 60.

Concentrically disposed within the magnetically permeable cup element 96 is a hollow, cylindrical, permanent magnet 100 the upper end face of which abuts the bottom of the cup element. Flatly bearing on the lower end face of the permanent magnet is an annular washer 102 of magnetically permeable material having a diameter somewhat larger than that of the magnet. Washer 102 is upwardly counterbored from its lower face to form annular seat 104, and the magnet 100 and washer 102 are secured in the cup element 96 by a hollow sleeve 106 which extends axially through the central openings in the magnet and washer and has a lower radial flange 108 bearing on the end annular seat 104 of the washer. The upper end of the sleeve 106 is externally threaded and extends through a central opening in the bottom of the cup element 96 which opening is downwardly counterbored to provide an upwardly facing annular seat 109 against which bears a nut 110 threaded on the upper end of the sleeve 106 to complete the attachment of the magnet and washer to the cup element 96.

Top panel 22 of the base 20 is formed with an opening 112 in axial alinement with the central opening in sleeve 106. Actuating members 60 each comprise a cylindrical rod which is fixed at opposite ends to the brackets 80 and which extends through the central opening in the respective one of the sleeves 106. As shown in FIGURE 2, the diameter of the opening in sleeves 106 is substantially greater than that of the rod comprising the associated actuating member 60 so that no physical contact exists between the latter and the sleeves.

Secured to the lower, annular edge of the cup member 96 is an annular plate 114 of magnetically permeable material, the inner diameter of which is somewhat larger than the outer diameter of the washer 102 so that there is formed between the washer and the plate 114 an annular opening 116. Extending through this annular opening 116 to the interior of the cup element 96 is a second cup element 118 of nonmagnetic material having a wall thickness less than the radial dimension of the annular opening 116 so that the cup element 118 will be spaced from the washer and annular plate 114. The bottom wall of cup element 118 has a central opening 120 receiving the corresponding actuating rod 60 which is threaded at the portion thereof extending through the bottom wall of the cup element 118. A pair of nuts 122 and 124 are threaded on the actuating rod 60 above and below the bottom wall of the cup element 118 and serve to retain the latter in a given axial position on the rod 60 while permitting adjustment of such axial position along the rod.

The cylindrical walls of the cup elements 118 are formed with annular grooves 126 in each of which is wound several turns of wire to form on each cup element 118 a coil 128. The end terminals of each coil are brought, through a pair of curved flexible cables 130, to a junction plate 132 secured to the upper surface of the bridge piece 50 of the rocker support 48 from whence a pair of leads 134, which form, in effect, a pair of common input terminals for the two coils 128, lead to an outlet connector 136 on the rear wall 26 of the base 20, as shown in FIGURE 3.

The magnet 100, cup element 96, annular plate 114, and washer 102, in each of the magnetic means 64, form a magnetic circuit having the annular space 116 as an air gap therein. The cup elements 118 are so axially positioned on their respective actuating rod 60 that in the normal, horizontal, or neutral, position of the platform 36, the coils 128 will be substantially, centrally, axially positioned with respect to the plane of the air gaps defined by the respective annular openings 116. Upon energization of the coils 128, the latter, and therefore, the cup elements 118 and the actuating rods 60 secured thereto will be moved upwardly or downwardly, depending on the direction of current flow through the coils, by the interaction of the electromagnetic fields of the coils and the magnetic flux across the air gaps 116 due to the magnets 100. The coils 128 are so wound on their respective cup members 118 that for a given voltage applied to the common leads 134 of the coils, the interaction of the aforementioned magnetic fields in one of the magnetic means 64 will cause upward rectilinear movement of its respective actuating rod 60 while the interaction of the magnetic fields in the other of the magnetic means 64 will produce downward rectilinear movement of its respective actuating member 60. This opposite rectilinear movement of the actuating rods 60 is converted into rocking movement of the platform 36 and rocker 46 by the aforedescribed operative connecting means 62.

The only point of contact between the movable elements, namely the platform 36, rocker 46 and actuating rods 60, and the stationary elements of the present roll table is at the point of engagement of the bearing pins 34 and 52 with their respective bearing plates so that substantially frictionless and noiseless operation is attained. The arcuately formed conductors 130 leading from the two coils 128 to the junction plate 132 permit flexing of these conductors with relative ease so as to not impede, to any appreciable extent, movement of said movable parts.

As will be more fully described with reference to the schematic circuit diagram of FIGURE 5, during operation of the system a voltage signal is applied across the common leads 134 for either oscillating the platform 36 at a desired frequency, or angularly displacing the platform from its neutral position by a given amount. A pointer 138 secured to the underside of the platform 36 and extending through an arcuate opening 140 in the forward panel 26, cooperates with a scale 142, fixed to the forward panel 26, to indicate the angular displacement of the platform 36 from its neutral position.

Cooperating with the magnetic means 64 to angularly displace the platform 36 by an amount proportional to the input signal is a feedback device, generally indicated at 144, which functions to generate a feedback signal proportional to the displacement of the platform 36 from its neutral position.

Feedback device 144 may comprise, for example, any suitable inductance ratio type pickup including a stationary housing 146 enclosing a tapped coil 152 or a series of coils the inductance of which is varied in accordance with the axial position of a movable magnetic core 148 therein. Stationary housing 146 is fixedly secured to the upper end of a supporting bracket 150 secured at its lower end to the upper panel 22 of the base 20. Magnetic core 148 has its upper end freely movable within and radially spaced from the coils 152 enclosed by the housing 146 and has its lower end rigidly secured to an arm 154 firmly mounted on the adjacent actuating rod 60. As is conventional in inductance ratio pickups, no physical contact exists between the magnetic core 148 and the stationary portions of the pickup so that no frictional resistance to movement of the actuating rods 60 and platform 36 is offered by the pickup device. Leads 156 from the pickup coils 152 extend to the outlet connector 136 at the rear of the base.

Platform 36 is formed with a plurality of spaced openings 158 which accommodate attachment of an instrument to be tested to the platform, as will be presently more fully described. A flexible conductor casing 160 is secured to the upper base panel 22 and is curved to overlie the platform 36. The free end of flexible casing 160 mounts an electrical connector 162 for attachment to the electrical terminals of the instrument under test. Electrical leads 164 extend from the connector 162 to an outlet connector 165 on the front panel 26 of the base 20.

Operation

Operation of the present roll table will be now described with reference to FIGURE 5. Prior to use of the present roll table, the bearing pins 34 are axially adjusted in the platform extensions 40 to place their pointed tips on the aforementioned common axis about which are generated the pairs of cylindrical surfaces 68 on the heads 66 carried by the platform 36. The platform and cylindrical heads 66 will then be supported on the bearing plates 30 for rocking about said common axis of the cylindrical surfaces. This rocking axis of the platform has been indicated by the letter X in FIGURE 5. The tension of the straps 84 and the axial positions of the rocker bearing pins 52 are then adjusted to place the lower rocker 46 in substantial parallelism with the platform 36 and to create the desired pressure of the bearing pins 34 and 52 on their respective bearing plates. As previously stated, the bottoms of the recesses 59 in the bearing plates 58 on rocker extensions 56 in which the pointed tips of the bearing pins 52 seat, lie on the common axis about which the cylindrical surfaces 68 on the rocker are generated so that during the rocking movement of the latter the cylindrical surfaces thereon will always oscillate about their true centers regardless of the axial positioning of the bearing pins 52.

Because of the above described rocking of the platform and rocker about the common centers of their respective cylindrical surfaces, the actuating rods 60 undergo pure rectilinear movement during rocking of the platform and rocker so that smoothness of operation of the system is substantially enhanced and substantially frictionless and noiseless operation is obtained. Also accurate conversion of the rectilinear movement of the actuating rods to directly proportion angular movement of the platform is achieved so that accurate, predetermined angular displacement of the latter may be obtained by the predetermined rectilinear movement of the actuating rods.

An instrument I to be tested or subjected to simulated flight conditions is now firmly mounted on the platform 36 in predetermined relationship to the rocking axis X thereof. Thus, for example, if the instrument I is an angular accelerometer, it will be located on the platform 36 with its sensitive axis in coincidence with the rocking axis X of the platform. If the instrument I is a linear accelerometer, it will be located in the platform with its sensitive axis extending normally to the rocking axis X and disposed in a plane passing through the rocking axis parallel to the platform.

Figure 5:
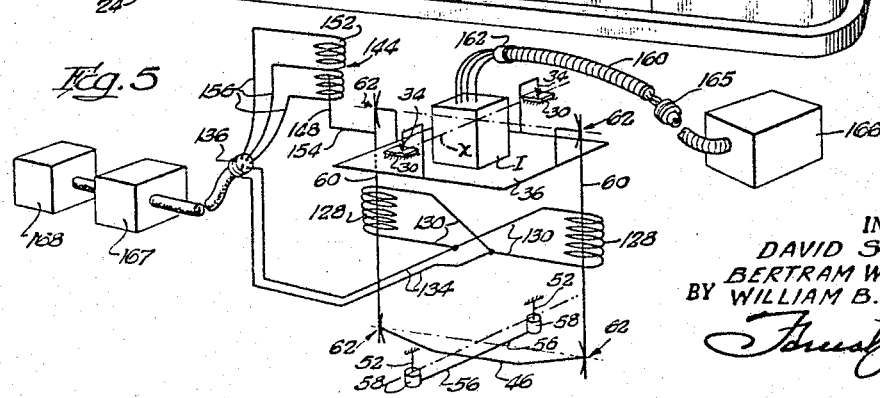
FIGURE 5 is a schematic diagram of the electrical circuit embodied in the present roll table.

As shown in FIGURE 5, the instrument I under test is electrically connected to electrical means 166 for energizing the instrument and for indicating, recording, or otherwise utilizing the output signal generated by the instrument in response to tilting or oscillation thereof. In practice, this connection is made by plugging the instrument leads into the receptacle 162 on the conductor casing 160 and plugging the leads of the means 166 into the front receptacle 165. The leads extending from the instrument to the receptacle 162 possess sufficient flexibility so that tilting of the instrument is substantially unrestricted.

The means 166 might comprise suitable electrical indicating or recording apparatus in the case of an instrument, such as an angular accelerometer, whose response, threshold, or other operating characteristics are to be determined. In a flight simulation test, the means 166 may comprise an automatic flight control system having the instrument I as a sensor thereof which is subjected to predetermined simulated flight conditions for determining the operating characteristics of the system.

The coils 128 in the electromagnetic means 64, for moving the actuating rods 60 to produce angular displacement for oscillation of the platform 36, have their common leads 134 connected to the output of a suitable, conventional amplifier 167 which in turn is fed by a conventional signal generating device 168. Depending on the purpose of the test, that is, whether the instrument I is to be subjected to oscillation of a predetermined frequency or is to be tilted a given amount, or in accordance with a simulated flight program, the device 168 may comprise an alternating signal generator or a D.C. signal generator. In the case of flight simulation tests, the device 168 may comprise an analogue computer or a magnetic tape input. Thus, in the case of an alternating signal generator the current to the coils 128 will be periodically reversed in direction so that the actuating rods 60 will be first moved in one direction and then in the other direction of rectilinear movement by the aforedescribed interaction of the magnetic fields in the means 64. This periodically reversed movement of the actuating rods 60 produces oscillation of the platform 36 about its axis X at a frequency determined by the frequency of the signal from the device 168. If on the other hand, the output of the device 168 is a D.C. signal, the current through the coils 128 will be unidirectional and the actuating rods will be moved in one or the other direction, depending on the direction of current flow, to angularly displace the platform 36 in a given direction.

The output of the feedback means 144 is fed to the amplifier 167 and generates a signal which is proportional to the angular displacement of the platform from its neutral, or normally horizontal position. The feedback signal fed to the amplifier is combined with the output signal from signal generator, through any conventional summing circuitry within the amplifier 167 in inverse phase relationship so that the output signal from the amplifier will be an error signal having a value equal to the difference between the generator signal and the feedback signal. At a predetermined angular displacement of the platform, the two signal inputs to the summing point will be equal but opposite in phase so as to produce a zero error signal to the coils 128.

For example, in the case of a D.C. signal source with a linear accelerometer mounted on the platform 36, in the manner previously described, the error signal fed to the coils 128 will produce predetermined angular displacement of platform 36 from its neutral position. The amount of this angular displacement will be a function of the magnitudes of the signals fed to the summing point so that accurate predetermined positioning of the platform may be achieved by adjusting generator 168 to obtain a desired output voltage. The force acting on the acceleration sensitive element of the accelerometer will be a sine function of the angle of tilt of the platform 36 so that a known acceleration force can be applied to the instrument and the output of the instrument, as indicated or recorded by the means 166, compared with this force to determine the accuracy, response, or threshold of the instrument. Because of the relatively low friction and operating noise inherent in the present roll table, extreme sensitivity and a low threshold are obtained, and exceedingly slight, yet accurately controlled, angular displacements of the platform 36 may be achieved so as to enable accurate testing of the instrument in the Micro "G" range of operation.

When, for example, an angular accelerometer or other other similar instrument is to be tested, it is mounted on the platform 36 in the manner previously described and the generator 168 is operated to apply to the coils 128 and alternating signal of a desired frequency to cause oscillation of the platform 36 at said frequency. The output of the instrument as recorded or indicated by the means 166 is then compared with the known frequency of oscillation and magnitude of oscillation of the of the instrument to determine its threshold and response characteristics. Again, because of the low friction and operating noise in the present roll table, the instrument may be accurately subjected to oscillations corresponding to operation in the Micro "G" range so as to permit accurate evaluation of the instrument within this range.

In the case of a flight simulation test, the generator 168 will comprise an analogous computer or magnetic tape device the output of which will vary in accordance with a simulated flight program. The instrument I under test may thus be subjected to predetermined simulated flight conditions, and its output may be fed to an automatic flight control system for simulated flight testing of the latter.

The underslung construction of the angular displacement platform 36, permits the instrument under test to be located with its sensitive axis in coincidence with the roll axis X of the platform so that in the case of an angular accelerometer, rate gyro, and the like, for instance, the sensitive element of the instrument will be subjected to pure angular displacement. The accuracy of the present roll table is, therefore, substantially improved over equipment of this general nature wherein inaccuracies are introduced by the instrument undergoing both angular and translational movement due, for example, to displacement of the instrument axis from the axis of angular movement of the test equipment.

While a present, preferred embodiment of the invention has been described and illustrated, it will be apparent to those skilled in the art that numerous modifications in design and arrangement of parts of the invention are possible within the scope of the following claims.

We claim:

1. A roll table comprising: a supporting base, a platform, rocking arm means substantially parallel to said platform, means rockably supporting said platform and rocker arm means on said base for rocking about spaced, substantially parallel axes, substantially parallel actuating rods rockably connected at opposite ends to said rocker arm means and platform at opposite sides of their respective rocking axes whereby axial movement of said rods in opposite directions imparts angular movement to the platform, an annular electromagnetic coil concentric with and fixed to each rod, a generally cylindrical permanent magnet concentric with each rod and fixed to said base, each magnet comprising a pair of annular, radially spaced pole pieces concentric with and located in a transverse plane of its respective rod, there being first magnetic field between the pole pieces of said magnets, the coil on each rod being axially movable in the annular space defined between said pole pieces of its adjacent magnet, said pole pieces having an axial dimension which is substantially less than the axial dimension of said coils and being located intermediate the ends of their respective coils when said platform occupies a given normal angular position, means for feeding electrical signals to said coils to create second magnetic fields about the coils which interact with said magnetic fields to angularly move said platform, and pick-up means including a pick-up coil fixed to said base and a permeable core fixed to one of said rods and movable in said pick-up coil when said platform is angularly moved for generating a feedback signal proportional to the angular displacement between the instantaneous angular position of the platform and its normal position.

2. The subject matter of claim 1 wherein said means to rockably support the platform and rocker arm means on the base comprise needle bearings, the only contact between the movable and stationary parts of said table being at said needle bearings.

3. A roll table comprising a generally rectangular platform having a relatively flat, normally upper surface for supporting an instrument to be tested, a pair of upstanding arms fixed to the two opposite sides of said platform, a supporting base, cooperating bearing means on the upper ends of said arms and on said base pivotally supporting said platform on said base for rocking of the platform about a normally horizontal axis approximately parallel to the two ends of the platform and spaced above said upper surface of the platform, outwardly facing generally semi-cylindric rocker heads mounted on and above said platform at opposite sides of and concentric with said axis, vertical actuating rods at opposite ends of said platform, planar portions at the upper ends of said rods engaging said semi-cylindric heads, means connecting said heads and planar portions for retaining said heads and portions in contact and causing said heads to roll on said planar portions when said rods are moved in opposite longitudinal directions so as to rock said platform about said axis, means on said base guiding said rods for longitudinal movement, and cooperating means on said base and rods for moving the latter in opposite longitudinal directions.

4. A roll table comprising a generally rectangular platform, a supporting base, means pivotally supporting said platform on said base for rocking of the platform about an axis midway between and parallel to the two ends of the platform, a rocker arm approximately parallel to said platform, means pivotally supporting said arm on said base for rocking of the arm about an axis midway between the ends of the arm and parallel to said first-mentioned axis, rocker heads on the platform and arm at opposite sides of said pivotal axes, respectively, each head having an outwardly facing cylindric surface concentric with the adjacent pivotal axis, parallel actuating rods extending between the rocker heads on the platform and arm, each rod having a pair of flat bearing plates at one opposite end bearing against the adjacent cylindric surfaces on the arm and platform, respectively, a strap between each adjacent head and bearing plate and extending from one end of the cylindric surface of the respective head, over a portion of the latter surface to a point on the proximate bearing plate adjacent the other end of the latter surface means securing opposite ends of each strap to its respective head and bearing plate, said last-mentioned means including adjustable fastening means for adjusting the tension of each strap to enable adjusting of the platform and arm into accurately parallel relationship.

References Cited in the file of this patent

UNITED STATES PATENTS

| | | |
|---|---|---|
| 2,470,773 | Haskins | May 24, 1949 |
| 2,583,791 | Neff | Jan. 29, 1952 |
| 2,599,036 | Efromson et al. | June 3, 1952 |
| 2,645,728 | Willson et al. | July 14, 1953 |
| 2,697,343 | Hirtreiter | Dec. 21, 1954 |
| 2,796,756 | Yates | June 25, 1957 |
| 2,835,832 | Efromson | May 20, 1958 |

OTHER REFERENCES

Honnell: "An Electromechanical Transducer System for the Transient Testing of Seismographs," Geophysics Magazine, vol. 28, No. 1, January 1953, pages 160–168 relied on.

Publication: Honnell, "Electronic Shade Table," Electronics, June 1954, pages 178, 179.